No. 864,544. PATENTED AUG. 27, 1907.
P. KESSLER & T. STEIN.
PIPE AND TUBE CLEANER.
APPLICATION FILED APR. 24, 1906.
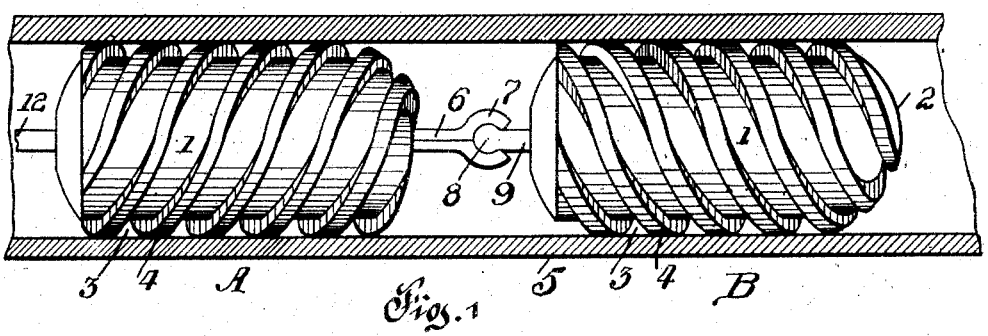
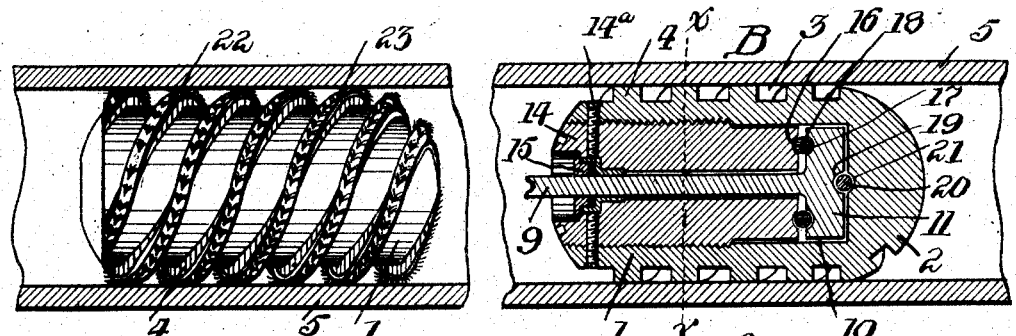
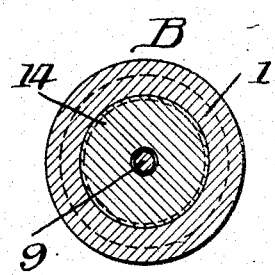
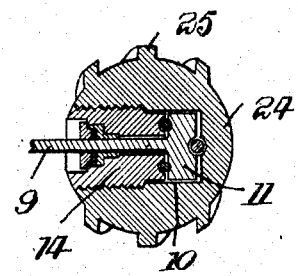
Witnesses.
E. A. Prokop.
K. K. Butler.
Inventors
PAUL KESSLER &
THEODORE STEIN.
H. Everitt.
by Attorneys.

UNITED STATES PATENT OFFICE.

PAUL KESSLER, OF HOMESTEAD, AND THEODORE STEIN, OF PITTSBURG, PENNSYLVANIA.

PIPE AND TUBE CLEANER.

No. 864,544.　　　Specification of Letters Patent.　　　Patented Aug. 27, 1907.

Application filed April 24, 1906. Serial No. 313,400.

*To all whom it may concern:*

Be it known that we, PAUL KESSLER, a subject of the King of Hungary, residing at Homestead, and THEODORE STEIN, a subject of the Emperor of Germany, residing at Pittsburg, in the county of Allegheny and State of Pennsylvania, have invented certain new and useful Improvements in Pipe and Tube Cleaners, of which the following is a specification, reference being had therein to the accompanying drawing.

This invention relates to certain new and useful improvements in pipe and tube cleaners, and the invention has for its primary object the provision of novel means for thoroughly cleansing the inside of a pipe or tube.

Our invention aims to provide a simple and inexpensive pipe or tube cleaner which can be used for removing corrosion, scales, soot, dirt or the like foreign matter from the inner walls of a pipe or tube.

Our invention is also applicable to sewers, spouting and the like conduits that become clogged and interfere with the passage of a fluid or liquid therethrough.

To this end, we have devised revolving cleaners which are particularly adapted for removing corrosion and scale from pipes or tubes, when the pipes or tubes have not become entirely clogged or ruined by the corrosion of the inner walls of the pipes or tubes.

The cleaners are revolved through the medium of a liquid or fluid forced through the pipe or tube, and said cleaners are provided with cutting edges similar to an ordinary auger, whereby the interior walls of a pipe or tube can be thoroughly cleansed and the cross area of the pipe or tube returned to its normal size.

With the above and other objects in view, which will more readily appear as the nature of the invention is better understood, the same consists in the novel construction, combination and arrangement of parts to be hereinafter more fully described and claimed, and referring to the drawing accompanying this application, like numerals of reference designate corresponding parts throughout the several views, in which:—

Figure 1 is a longitudinal sectional view of a piece of pipe or tubing having our improved cleaners arranged therein, Fig. 2 is a similar view illustrating a slightly modified form of cleaner, Fig. 3 is a longitudinal sectional view of one of the cleaners within a pipe or piece of tubing, Fig. 4 is a cross sectional view taken on the line $x$—$x$ of Fig. 3, and Fig. 5 is a detail sectional view of a slightly modified form of cleaner.

To put our invention into practice, we construct our improved cleaners A and B of a cylindrical body portion 1 having a rounded or bullet-shaped head 2. The cylindrical body portion is provided with a spirally arranged groove 3 forming spirally arranged cutting ribs 4, which are adapted to engage the inner walls of a pipe or piece of tubing 5. The spirally arranged grooves 3 and cutting ribs 4 of the cleaner A, are arranged the reverse of the cleaner B, whereby when the cleaners are being driven through a pipe or piece of tubing, one cleaner will rotate in a reverse direction to the other cleaner, thereby insuring a perfect cleaning of the pipe or piece of tubing.

In practice, two cleaners are preferably used in removing foreign matter from the interior of a pipe or tube, and these cleaners are connected together by providing the cleaner A with an outwardly extending arm 6, carrying a socket 7 adapted to receive the ball-end 8 of a rearwardly extending arm 9 carried by the cleaner B. The socket 7 together with the ball arm 8 forms a universal joint whereby one cleaner can revolve irrespective of the other cleaner.

The cleaners A and B are provided with longitudinally disposed bores 10 in which are mounted heads 11, that carry the rearwardly extending arms 9 and 12 of the cleaners A and B. The heads 11 are retained within the bores 10 by screw plugs 14 which are provided with stuffing boxes 15 of a conventional form, to form a non-leakable connection between the cleaners and their respective arms. Screws 14ª are employed for locking the screw plugs 14 and the stuffing boxes 15 within the cleaners, as clearly illustrated in Fig. 3 of the drawing. The rear end of the screw plug 14 of each cleaner is provided with an annular ball bearing race 16, while the one side of the head 11 is provided with a similar race 17. Between the races are mounted antifriction balls 18. The opposite side of the head 11 is provided with a central race 19 in which is mounted an antifriction ball 20 adapted to bear in a race 21 formed centrally of the bore 10. By this construction, it will be possible for the cleaners to rotate irrespective of their arms and by employing ball bearings, an easy rotation of the cleaners within a pipe or tube is accomplished.

In Fig. 2 of the drawings, we have illustrated a cleaner wherein the cutting ribs 4 are bound by a metallic strip 22 having serrated or roughened edges 22 adapted to cut into any foreign ingredient that may adhere to the inner walls of a pipe or tube.

In order that the cleaners may be used in a curved pipe or tube, we construct some of the cleaners of a spherical body 24 having cutting ribs 25. The spherical body 24 is used for passing around a curve in a pipe or tube and a plurality of these bodies may be connected together similar to the cleaners A and B.

In operation, a liquid or fluid is forced into a pipe or tube in the end of which the cleaners have been placed and as the liquid or fluid is forced through the pipe or tube, it revolves the cleaners A and B and causes them to travel forwardly cutting and removing foreign ingredients that adhere to the innner walls of a pipe or tube. The fluid or liquid under pressure striking the cutting ribs 4 causes the cleaners to rotate, the cutting ribs in this instance serving as blades which propel the cleaners and when backed by a considerable pressure of liquid or fluid, the cleaners will be forced forwardly until the entire piece of pipe or tubing has been cleansed.

We preferably construct the bodies of the cleaners of strong and durable metal, and they may be made of various sizes to fit various sizes of pipes or tubing.

Our invention is particularly adapted for removing soot and dirt from boiler flues, which in a great many instances are inconvenient to reach with long poles or the like cleansing instruments, but it is obvious that the cleaners may be used for numerous purposes.

Such changes in the construction and operation of my improved cleaners, as are permissible by the appended claims, may be resorted to without departing from the spirit and scope of the invention.

What I claim and desire to secure by Letters Patent, is:—

In a tube cleaner, a rotatable cleaner-body having peripheral cutting ribs, and having a recess in one end, a plug fitted in the recess and having an axial-bore and being of less length than said recess whereby to leave a space between the inner end of the plug and the end wall of the recess, a shaft mounted to revolve in said bore and having a head free to revolve in the space between the end of the plug and the end wall of the recess, the said shaft and head free to revolve independently of the cleaner-body and plug, antifriction balls interposed between the inner end of the plug and said head and between the head and the end wall of the recess, means within the end of the plug and surrounding the shaft for sealing the bore around said shaft, and means securing the plug to the cleaner-body whereby said plug and cleaner-body rotate in unison.

In testimony whereof we affix our signatures in the presence of two witnesses.

PAUL KESSLER.
THEODORE STEIN.

Witnesses:
E. E. POTTER,
K. H. BUTLER.